United States Patent
Yang et al.

(10) Patent No.: US 6,288,518 B1
(45) Date of Patent: Sep. 11, 2001

(54) EMERGENCY SUPPLEMENTAL CHARGING DEVICE

(76) Inventors: Tai-Her Yang, No. 59, Chang Hsing 8 St., Si-Hu Town, Dzan-Hwan; Yang Chen, 3F, No. 21, Lane 20, Chung Chang N. Rd., Sanchung City, Taipei Hsien, both of (TW)

(*) Notice: Subject to any disclaimer, the term of this patent is extended or adjusted under 35 U.S.C. 154(b) by 0 days.

(21) Appl. No.: 09/425,935

(22) Filed: Oct. 25, 1999

(30) Foreign Application Priority Data

Oct. 7, 1999 (TW) ................................................ 88117316

(51) Int. Cl.$^7$ ................................ H02J 7/00; H02J 7/04
(52) U.S. Cl. ........................................... 320/103; 320/132
(58) Field of Search ..................................... 320/103, 132; 324/429; 340/636

(56) References Cited

U.S. PATENT DOCUMENTS 4,510,431 * 4/1985 Winkler ................................. 320/103
5,565,756 * 10/1996 Urbish et al. .......................... 320/103
6,072,300 * 6/2000 Tsuji ..................................... 320/116

* cited by examiner

Primary Examiner—Peter S. Wong
Assistant Examiner—Gregory J. Toatley, Jr.
(74) Attorney, Agent, or Firm—Bacon & Thomas

(57) ABSTRACT

A emergency battery charger includes a secondary cell contact structure for connecting a rechargeable battery to be charged (the secondary cell) with a primary cell power supply consisting of one or more conventional batteries having an aggregate voltage higher than a rated voltage of the secondary cell, thus providing a DC to DC charger that can be used once in emergency situations. The secondary cell contact structure for connecting like polarity terminals of the primary cell power supply and the secondary cell may be contained in the same housing as the primary cell power supply or in a separate housing, and the charger may include such additional elements as an on/off switch, voltage or current detectors and a central processing unit, a circuit breaker, and/or a current limiter.

13 Claims, 3 Drawing Sheets

EMERGENCY SUPPLEMENTAL CHARGING DEVICE

BACKGROUND OF THE INVENTION

1. Field of the Invention

This invention relates to an emergency supplemental charging device for rechargeable batteries.

2. Description of Related Art

In traditional portable electric appliances, such as radios, portable cassette players, or portable compact computers, the power supply is often provided in the form of a cell or battery pack containing cells rechargeable at least twice, preferably using an A.C. to D.C. converter. Unfortunately, however, use of such converters may be limited by differences in power supply voltage ratings and frequency, differences in socket specifications encountered from one country to another, or because the user forgets to bring the charger with him. As a result, there is a need for an inexpensive but convenient emergency charging device that can be used when the conventional A.C. to D.C. converter cannot be used or is unavailable.

SUMMARY OF THE INVENTION

The primary object of the present invention, therefore, is to provide an emergency supplemental charging device, in which the emergency charging power is in the form of a single-piece single-use cell arranged in a popular configuration. The single-use cell may be packaged in any manner necessary to meet the requirements of specific applications, and is designed to match a secondary cell which serves as the load to be charged. In addition, to enhance the safety features of the target load, additional means such as switches, overcurrent protection circuits, breakers, or current limiters may be incorporated, including an optional current or voltage meter display, or even a central processing unit to control the charging output so that the charging operation may be carried out effectively and safely.

DETAILED DESCRIPTION OF THE PREFERRED EMBODIMENTS

Figure 1:
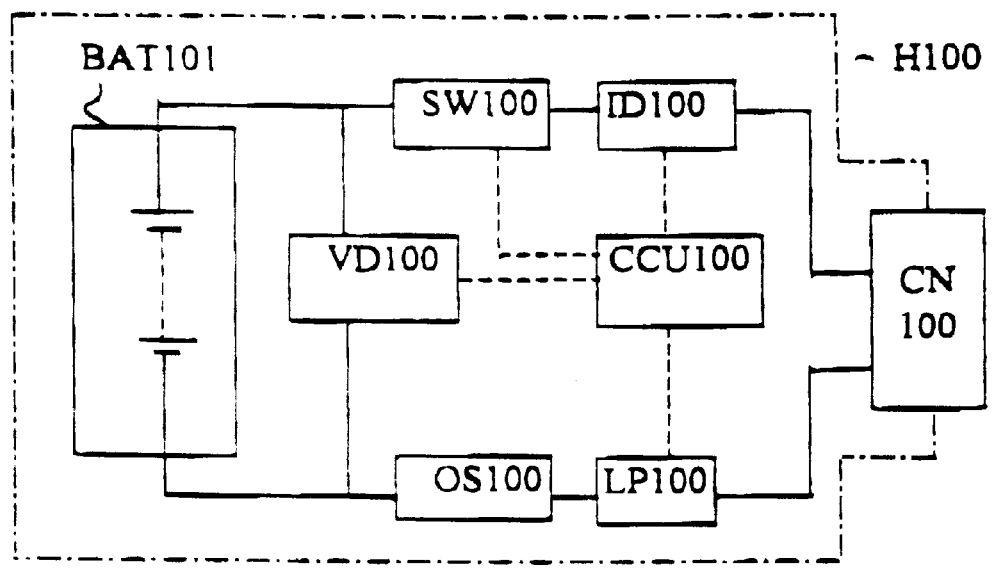
FIG. 1 is a schematic circuit diagram of a one-piece embodiment of the invention.

The emergency supplemental charging device of the invention is designed essentially to execute emergency charging of a secondary cell which forms a specific loading target, the power supply being a primary cell whose voltage is higher than the rated voltage of the secondary cell which constitutes the load to be charged. The charging is effected by coupling the secondary cell with contacts in a secondary cell contact compartment, structure, or device through a unique like-polarity-on-like-polarity parallel connection in a separate or engaged setting, as will be better appreciated by referring to FIG. 1, which illustrates a basic structure of a one-piece embodiment of the invention, comprising essentially:

Primary cell power supply BAT101, which consists of one or more cells in serial or parallel connection, the voltage of which is higher than the rated voltage of the secondary cell forming the charging target;

Secondary cell contact compartment CN100, which services as an interface to the secondary cell that forms a target load using a like-polarity-on-like-polarity parallel connection that opens the charging circuit when separated and closes it when completed, the secondary cell contact compartment including a plug and socket integrated with it, or alternatively bearing a lay-in engagement structure that serves to transport energy away from the primary cell power supply to the second cell that forms the target charging load;

Overcurrent circuit breaker OS100, which is interposed between the aforesaid primary cell and the secondary cell contact structure to serve as an output interface, and optionally including a short circuit protection fuse in series with the power supply, or an electromechanical or solid state overcurrent breaker;

Limiting protector LP100, which is composed of a positive temperature coefficient (PTC) resistor or resistors, or electromechanical or solid state electronic components connected in series with the power supply and arranged such that the impedance increases with an increase in current, but decreases with a decrease in current, and optionally provided between the aforementioned primary cell power supply and the secondary cell contact structure that serves as an output interface;

Optional current detector ID100, which may be an analog or digital output type detector with an optional brightness display feature, the detector being arranged to detect analog or digital current signals for reference or control purposes when installed between the aforementioned primary cell power supply and the secondary cell contact structure that serves the purpose of an output interface;

Switch SW100 in the form of a manually or signal controlled solid state or mechanical device installed optionally between the aforesaid primary cell power supply and the secondary cell contact structure that serves the purpose of an output interface;

Voltage detector VD100, which may operate in analog or digital mode, and which is composed of mechanical or solid state electronic components installed optionally between both poles of the aforementioned primary cell, and an optional brightness display serving to control or keep as reference data analog or digital voltage signals;

Central control unit CCU100 provided optionally to control the current limiting protector or switch by referencing an output current and voltage of the primary cell, and preventing the current from exceeding a predetermined value through use of an increased impedance upon actuation of the overcurrent limiter or switch, the output current being cut once the current has attained a present value; and Housing H100 composed of an insulator, or a non-insulator with insulation linings, to accommodate the aforementioned devices, and implemented in the form of a one-piece structure.

As an alternative embodiment, the secondary cell contact structure may be provided independent of the aforementioned emergency charging device, and linked together with the emergency charging device by means of a lead wire or a second plug/socket module.

Figure 2:
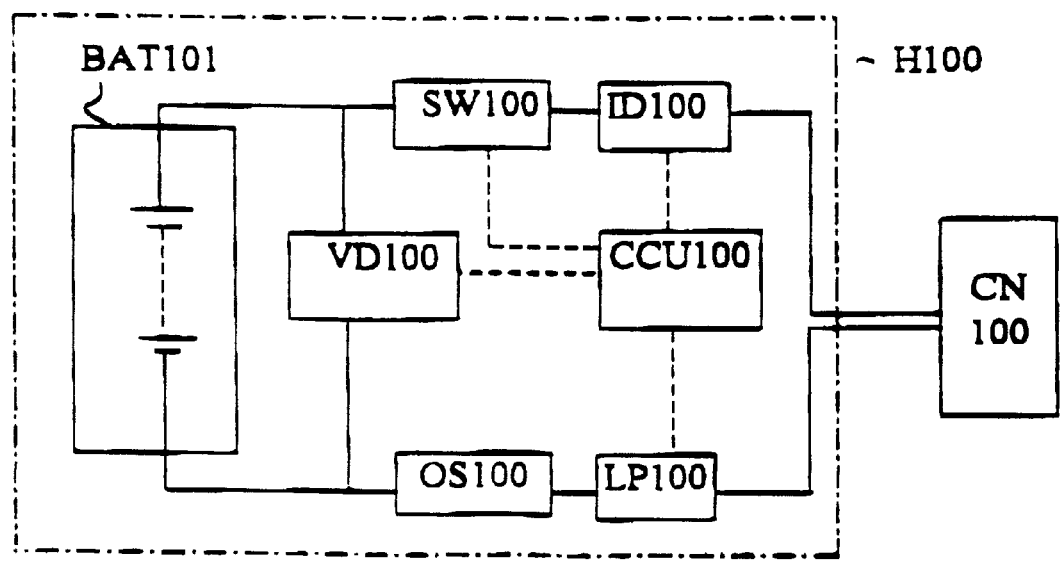
FIG. 2 illustrates an example of the invention incorporating a discrete secondary cell contact structure.

An example of a separable secondary cell contact structure structured according to the present invention is illustrated in FIG. 2.

Figure 3:
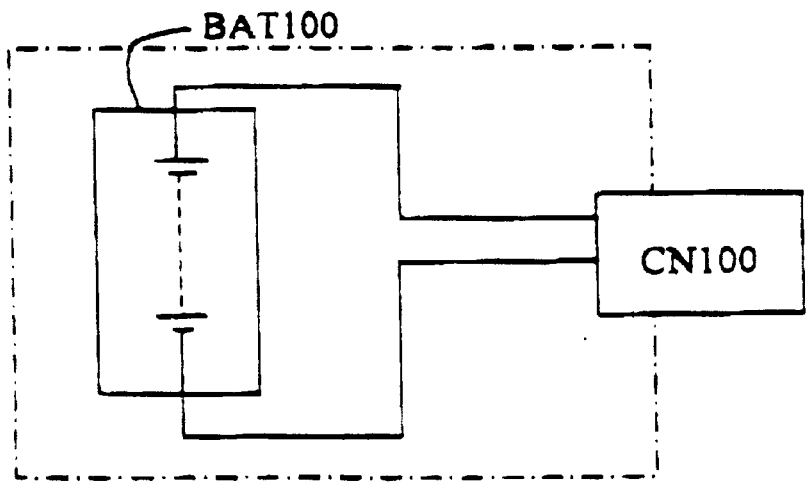
FIG. 3 illustrates the invention embodied in a primary cell linked to a secondary cell contact structure.
Figure 4:
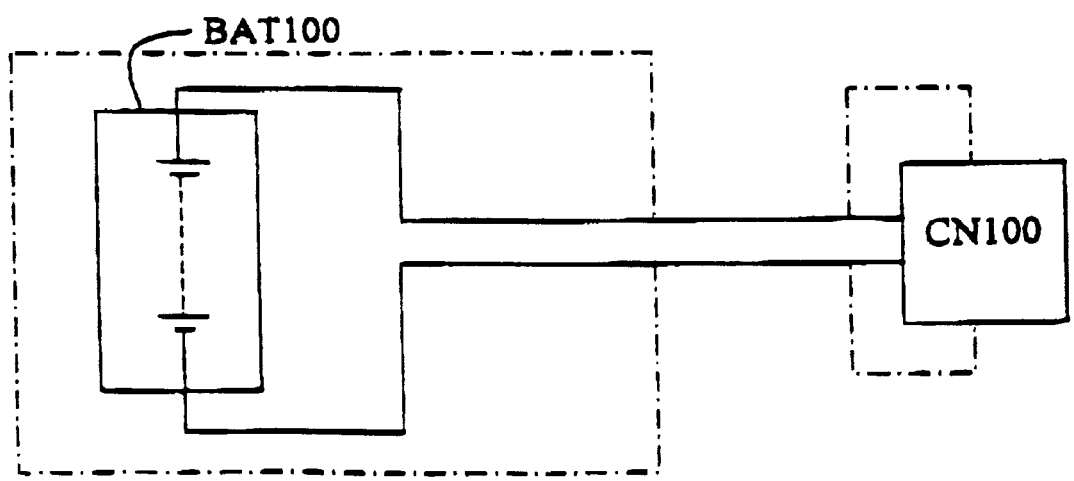
FIG. 4 illustrates an embodiment of the invention in which the primary cell is separate from the secondary cell contact compartment.
Figure 5:
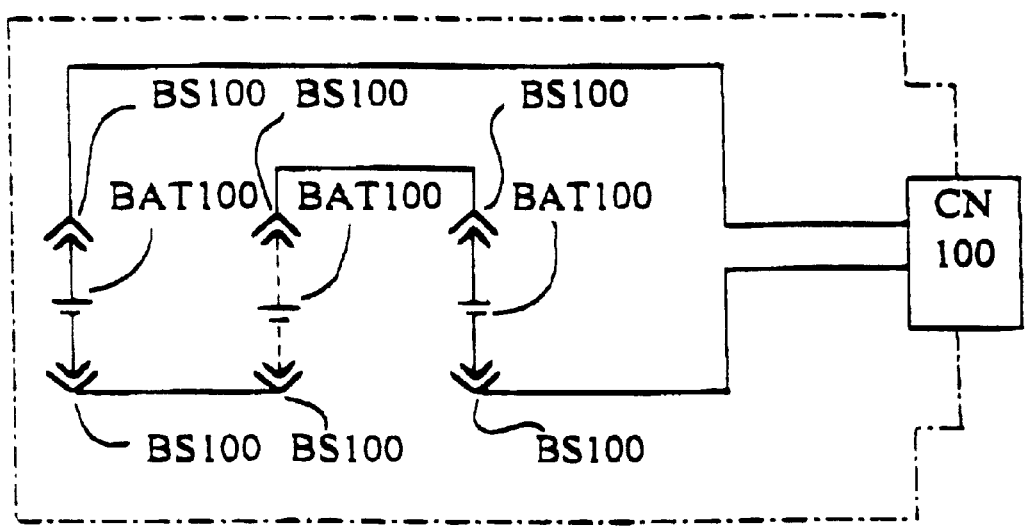
FIG. 5 is an illustration of an example of the invention in which the primary cell is mounted to the secondary cell contact compartment.
Figure 6:
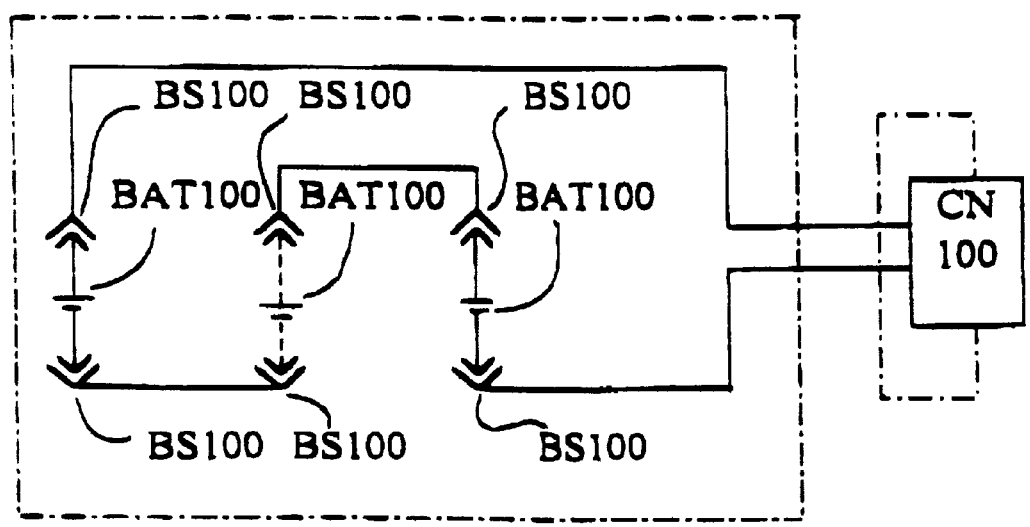
FIG. 6 illustrates an embodiment of the invention in which the primary cell assembly is integral with the cell mounting, and associated with a separately installed secondary cell contact compartment by means of a coupling laser.

In practical applications, taking into account different schemes of realization and cost considerations, the emergency supplemental charging device of the invention may be embodied by way of any of the alternatives described below:

1. The primary cell power supply BAT100 of the emergency supplemental charging device and the secondary cell contact structure CN100 forming the output interface may be welded together in the form of a package housing H100, such as is demonstrated in the illustration of FIG. 3;
2. The primary cell power supply BAT100 of the emergency supplemental charging device may be connected with the secondary cell contact structure CN100 to serve as the output interface through a lead, an example of the invention executed such that the primary cell and the secondary cell contact structure are separate from each other being shown in FIG. 4;
3. The secondary cell contact interface CN100 may be arranged to permit separate or combined operation with the specific load input interface as part of the emergency supplemental charging device, the cell mounting BS100 and the primary cell power supply BAT100 being structurally integrated with the housing H100, such as is shown in FIG. 5; and
4. In the emergency supplemental charging device, the cell mounting BS100 and the laid-in primary cell power supply BAT100 may be incorporated in and therefore integrated with the housing H100, to be thereupon linked to the secondary cell contact structure CN100 serving the purpose of an output interface by the intervention of a lead wire arrangement, such as is shown in FIG. 6.

In summary, in the emergency supplemental charging device, the emergency charging derives its power from the most popular standard single-piece primary cell, whereas a secondary cell to match a target load of a desired package feature may be designed per specific requirements. In addition, to enhance the safety features of the target load, additional components such as switching means, overcurrent protection means, a breaker or current limiter, and preferably a current or voltage display, may be installed to enhance the efficiency and safety of the charging/outputting operation, resulting in simplified structure and low cost features that demonstrate convenience and utility.

What is claimed is:

1. An emergency supplemental charging device for charging a secondary cell, comprising:

a primary cell power supply having a DC voltage higher than a rated voltage of the secondary cell;

a secondary cell contact structure for connecting the primary cell power supply in parallel with the secondary cell to thereby cause the primary cell power supply to charge the secondary cell; and a current-limiting device having an impedance proportional to variations in current passing through the current-limiting device, and connected between the primary cell power supply and the secondary cell contact structure for protecting the secondary cell from current variations.

2. An emergency supplemental charging device as claimed in claim 1, further comprising a circuit breaker device connected between the primary cell power supply and the secondary cell contact structure for protecting the secondary cell from excessive current.

3. An emergency supplemental charging device as claimed in claim 1, further comprising an output current detector connected between the primary cell power supply and the secondary cell contact structure, and a display for displaying a charging current value.

4. An emergency supplemental charging device as claimed in claim 1, further comprising an on/off switch connected in between the primary cell power supply and the secondary cell contact structure.

5. An emergency supplemental charging device as claimed in claim 1, further comprising a voltage detector and corresponding voltage display connected in parallel with the secondary cell when the secondary cell is positioned in the secondary cell contact structure.

6. An emergency supplemental charging device as claimed in claim 1, further comprising a central control unit for controlling a current limiter or switch based on a detected current and voltage.

7. An emergency supplemental charging device as claimed in claim 1, wherein said secondary cell contact structure connects like polarity terminals of the secondary cell and the primary cell power supply.

8. An emergency supplemental charging device as claimed in claim 1, wherein the secondary cell contact structure and the primary cell power supply are in a single housing, the secondary cell contact structure including lead wires for connection to the secondary cell.

9. An emergency supplemental charging device as claimed in claim 1, further comprising a cell encasement for housing a primary cell of the primary cell power supply.

10. An emergency supplemental charging device as claimed in claim 9, wherein said cell encasement and secondary cell contact structure are integrally included in a single housing.

11. An emergency supplemental charging device as claimed in claim 9, wherein said cell encasement and secondary cell contact structure are separately provided and connected by a lead wire.

12. An emergency supplemental charging device as claimed in claim 1, wherein said primary cell power supply comprises a plurality of primary cells connected in series.

13. An emergency supplemental charging device as claimed in claim 1, wherein said primary cell power supply comprises a plurality of primary cells connected in parallel.

* * * * *